United States Patent
Fukawa (10) Patent No.: US 6,805,472 B2
(45) Date of Patent: Oct. 19, 2004

(54) VEHICLE LIGHT APPARATUS

(75) Inventor: Kiyotaka Fukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 43 days.

(21) Appl. No.: 10/261,501

(22) Filed: Oct. 2, 2002

(65) Prior Publication Data

US 2003/0067780 A1 Apr. 10, 2003

(30) Foreign Application Priority Data

Oct. 4, 2001 (JP) ..................................... P.2001-308350

(51) Int. Cl.⁷ ............................. B60Q 1/08; B60Q 1/06
(52) U.S. Cl. ..................... 362/466; 362/464; 362/465; 701/49
(58) Field of Search ............................... 362/466, 465, 362/464; 701/49

(56) References Cited

U.S. PATENT DOCUMENTS

| | | | |
|---|---|---|---|
| 5,404,279 A | | 4/1995 | Wood |
| 6,049,749 A | * | 4/2000 | Kobayashi .................... 701/49 |
| 6,481,876 B2 | * | 11/2002 | Hayami et al. .............. 362/464 |
| 6,626,563 B2 | * | 9/2003 | Nishimura et al. ......... 362/465 |
| 2001/0026451 A1 | * | 10/2001 | Hasumi et al. .............. 362/466 |

* cited by examiner

Primary Examiner—Stephen Husar
Assistant Examiner—James Cranson
(74) Attorney, Agent, or Firm—Sughrue Mion, PLLC (57) ABSTRACT

The lighting directions of a plurality of lamps RL and LL are controlled independently or integrally corresponding to a running condition. When a vehicle changes a running direction, the direction of the optical axis of one of the lamps is deflected earlier in the running direction and the direction of the optical axis of the other lamp is maintained in a straight running direction in a running condition in which other cars or obstacles might be present in the straight running direction of the vehicle, and the direction of the optical axis of the other lamp is deflected with a delay upon receipt of a further steering operation. It is possible to carry out an illumination in the running direction and the straight running direction of the vehicle. In particular, the invention is very effective for maintaining the safety running of the vehicle on an intersection road or at time of a lane change.

14 Claims, 10 Drawing Sheets

VEHICLE LIGHT APPARATUS

BACKGROUND OF THE INVENTION

The present invention relates to a lighting system such as a headlamp or a fog lamp which illuminates the forward part of a vehicle such as a car, and more particularly to a vehicle light apparatus which has the function of controlling a change in a lighting direction or a lighting area of a lamp light in response to a running situation and can properly carry out lighting in order to realize the safe running of the vehicle.

In order to enhance the running safety of a car, it is necessary to illuminate the running direction of a vehicle. A lamp for illuminating the forward part of a car such as a conventional headlamp or fog lamp of the car is constituted to illuminate the straight running direction of the car. In the case in which the car changes a course direction on an intersection road (a T-shaped road, a crossroad and so forth) or a curved road (an S-shaped road, a U-shaped road and so forth), therefore, the forward part of a course to be changed cannot be illuminated previously and a forward confirmation is carried out insufficiently so that there is a problem in respect of safe running. For such a problem, there has been proposed a lighting system in which a lighting range, that is, a lighting direction or a lighting area of a lamp is changed according to the steering operation of a car. For example, a lighting optical axis to be the lighting direction of a lamp for illuminating the forward part of a car can be changed transversely or a lighting area to be a range in which the lamp can carry out lighting can be changed, and furthermore, a steering angle (a steering angle of a steering wheel) which is closely related to the running direction of the car can be detected by a steering sensor for detecting the rotating angle of a steering wheel, for example, and the lighting direction of the lamp can be turned in the running direction of the car based on the detection output of the steering sensor or the lighting area can be enlarged in the running direction. Thus, the running direction of the car on an intersection road or a curved road can be illuminated previously, which is effective for safe running.

However, the conventional lighting system serves to control the lighting range according to a steering angle. For this reason, it is hard to carry out a proper lighting control to cope with various running situations of a car in some cases. For example, in the case in which running is carried out on a curved road having a small radius of curvature, it is desirable that a driver should confirm the situation of a curved road in a running destination earlier than the execution of a steering operation. In the conventional lighting system in which the lighting range depends on the steering angle, however, it is hard to enlarge the lighting range in a greater angular direction than an angle corresponding to the steering angle and the situation of the curved road of the running destination cannot be confirmed sufficiently in some cases. Therefore, there has been proposed a lighting system for earlier carrying out an illumination in a running direction when a steering operation is performed in the case in which a car runs on a curved road or an intersection road, which is effective for solving the problems. If the running direction is uniformly illuminated earlier in the lighting system of this type, the illumination in a straight running direction of a vehicle is reduced so that a safety confirmation in a straight running direction becomes insufficient. Also in the case in which the steering operation is carried out at the time of the start of the vehicle, moreover, an illumination in the directly forward direction of the vehicle is apt to be insufficient according to a steering angle or when the illumination is executed earlier. Also in the case in which the steering operation is executed, accordingly, it is preferable that an illumination should be performed in the straight running direction of a self-vehicle in such a manner that a safety confirmation can be carried out.

Moreover, the lighting system of this type is constituted to predict the running direction of a vehicle, thereby controlling a lighting range. In the case in which an error is made in the prediction of the running direction, particularly, the case in which the vehicle is predicted to be turned irrespective of straight running, the safety confirmation in the straight running direction is carried out insufficiently. In the case in which the vehicle is predicted to run straight when it is to be turned, it is hard to obtain an advantage that the earlier illumination in the running direction to be the benefit of the lighting system of this type is carried out and the lighting system of this type can function as a lighting system for an ordinary vehicle comprising no lighting system. Also in the former case, therefore, it is preferable that the safe confirmation should be maintained.

SUMMARY OF THE INVENTION

It is an object of the invention to provide a vehicle light apparatus which can automatically carry out a proper control of a lighting range in response to the steering operation of the vehicle and can reliably execute a safety confirmation in the straight running direction of the vehicle, there by performing a preferable illumination for the safe running of the vehicle.

The invention provides a vehicle light apparatus comprising a plurality of lighting means each of which illuminates forward a vehicle, lighting direction control means which changes a lighting range of said lighting means in response to a steering angle of the vehicle, and controls lighting directions of the lighting means independently or integrally in response to a running condition. More specifically, the lighting direction control means changes the lighting direction of a part of the lighting means and changes the lighting direction of the other part of the lighting means later than the part of the lighting means. For example, the lighting direction control means carries out a control such that the other part of the lighting means performs an illumination earlier in a straight running direction than the part of the lighting means when a steering angle is changed from a steering direction into the straight running direction. Alternatively, the lighting direction control means carries out a control such that the other part of the lighting means performs an illumination later in a steering direction than the part of the lighting means when a steering angle is changed from a straight running direction to the steering direction.

In the invention, moreover, the lighting direction control means includes running road predicting means for predicting a running direction of the vehicle and serves to control a change in each of the lighting directions when a running direction of the vehicle is guessed to be greatly changed by the running road predicting means.

According to the invention, when the vehicle changes the running direction by steering, the direction of the optical axis of one of the lighting means is deflected earlier and the direction of the optical axis of the other lighting means is maintained in the straight running direction in a running condition in which other cars or obstacles might be present in the straight running direction of the vehicle, and the direction of the optical axis of the other lighting means is deflected with a delay upon receipt of further steering. Consequently, it is possible to carry out an illumination in the running direction and the straight running direction of the vehicle respectively, which is preferable for maintaining safety running.

DETAILED DESCRIPTION OF THE PREFERRED EMBODIMENTS

Figure 1:
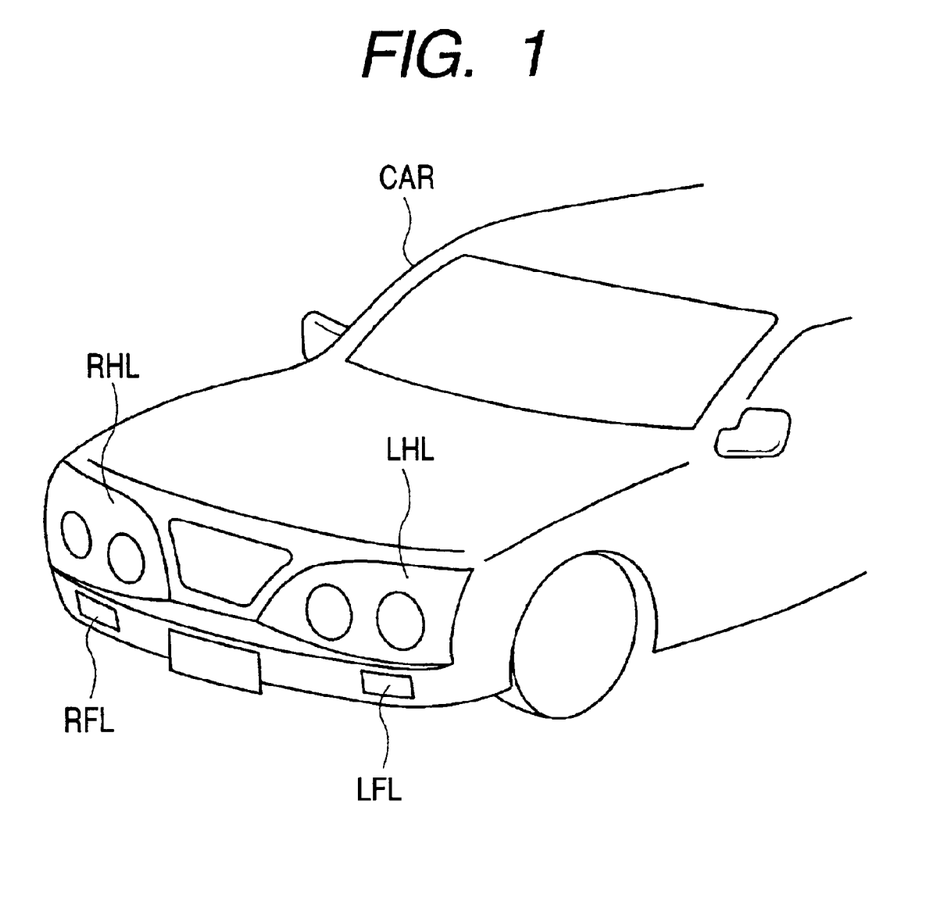
FIG. 1 is a schematic perspective view showing the forward part of a car to which a lighting system according to the invention is applied.

Next, an embodiment of the invention will be described with reference to the drawings. FIG. 1 is a schematic view showing a car to which a vehicle light apparatus according to the invention is applied. A left headlamp LHL and a right headlamp RHL are provided on the left and right in the front part of a body of a car CAR, respectively. Moreover, a left fog lamp LFL and a right fog lamp RFL are provided in lower positions of the headlamps of the body. These lamps have lamp components such as a lamp body, a light source and a reflector which are not particularly restricted, and include a lighting direction control mechanism for changing the lighting direction of the lamp, that is, the direction of the optical axis of the lamp as will be described below. It is a matter of course that the lighting direction control mechanism can carry out a control for satisfying a light distribution characteristic required for each of a high beam and a low beam in each headlamp. Herein, the direction of the optical axis can be changed in the light distribution characteristic of the low beam. Also in a fog lamp, moreover, it is possible to enlarge or reduce the lighting direction in the transverse direction.

Figure 2A:
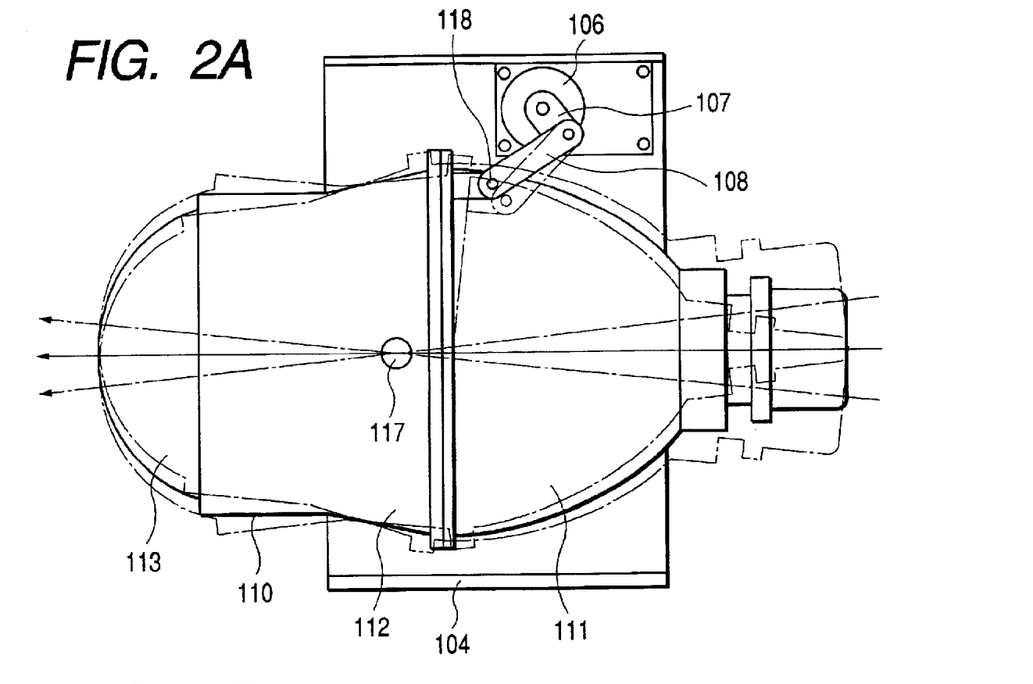
FIGS. 2A and 2B are a plan view and a longitudinal sectional view showing a projector type lamp.
Figure 2B:
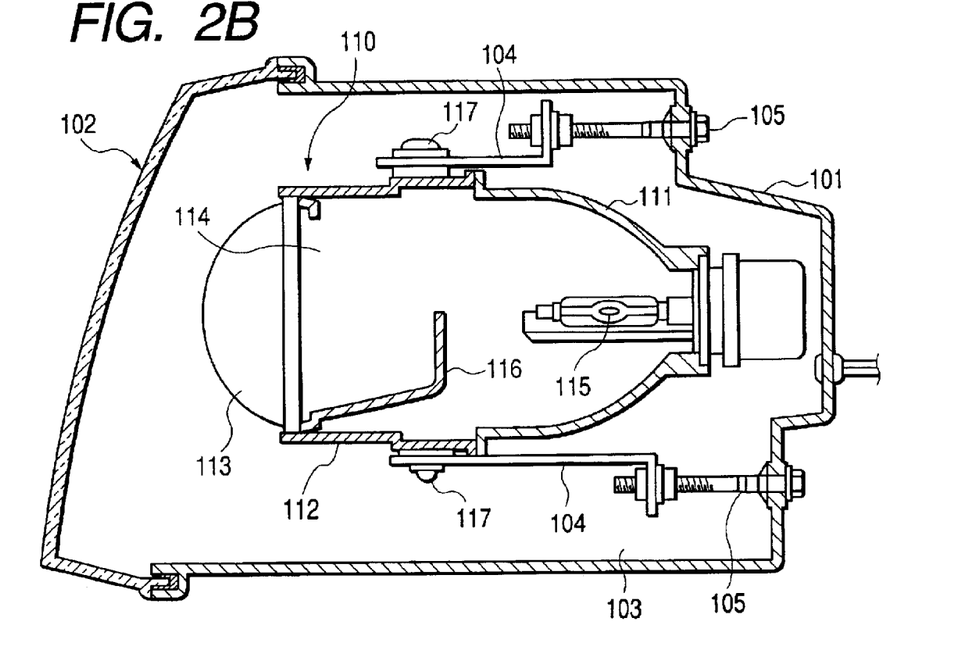

FIGS. 2A and 2B are a plan view and a longitudinal sectional view showing a schematic structure in the case in which the headlamp or the fog lamp is constituted by a projector type lamp and the lighting direction control mechanism of the lamp is provided. More specifically, a projector lamp 110 is provided in a lamp housing 103 constituted by a container-shaped lamp body 101 having a forward part opened and a transparent cover 102 attached to the front opening of the lamp body. In the projector lamp 110, a lamp housing 114 is formed by a reflector 111 taking the shape of a paraboloid of revolution and having an inner part mirror finished as is well known, a cylindrical holder 112 attached to the front opening of the reflector 111, and a condensing lens 113 attached to the front end of the holder 112, a discharge bulb 115 to be a light source is supported on the reflector in the lamp housing 114, and a shade 116 for shielding a part of a light emitted from the discharge bulb 115 to obtain a required light distribution characteristic is supported on the holder 112.

The projector lamp 110 has a pivot shaft 117 erected on the upper and lower surfaces of the holder 112, and is pivotally supported on a support frame 104 provided along the internal wall of the lamp housing 103 with the pivot shaft 117 and can be tilted in a transverse direction over a horizontal plane by using the pivot shaft 117 as a fulcrum. In the embodiment, the support frame 104 is supported with screws 105 in two upper and lower portions with respect to the lamp body 101 respectively and the support frame 104 is tilted in a vertical direction in a vertical plane by manually adjusting the screws 105 so that the optical axis of the projector lamp 110 can be changed in the vertical direction.

Moreover, a motor 106 having a rotating shaft turned in the vertical direction is fixed into the support frame 104 and a crank 107 is integrally attached to the rotating shaft of the motor 106, and the tip portion of the crank 107 and a pin shaft 118 provided on a part of the upper surface of the projector lamp 110 are coupled to each other through a connecting arm 108. Consequently, a lighting direction control mechanism is constituted and rotating force applied by driving the motor 106 is transmitted to the projector lamp 110 through the crank 107 and the connecting arm 108, and the projector lamp 110 is tilted in a transverse direction around the pivot shaft 117 as shown in a broken line of FIG. 2A so that a change in the direction of the optical axis can be controlled in the transverse direction.

Figure 3A:
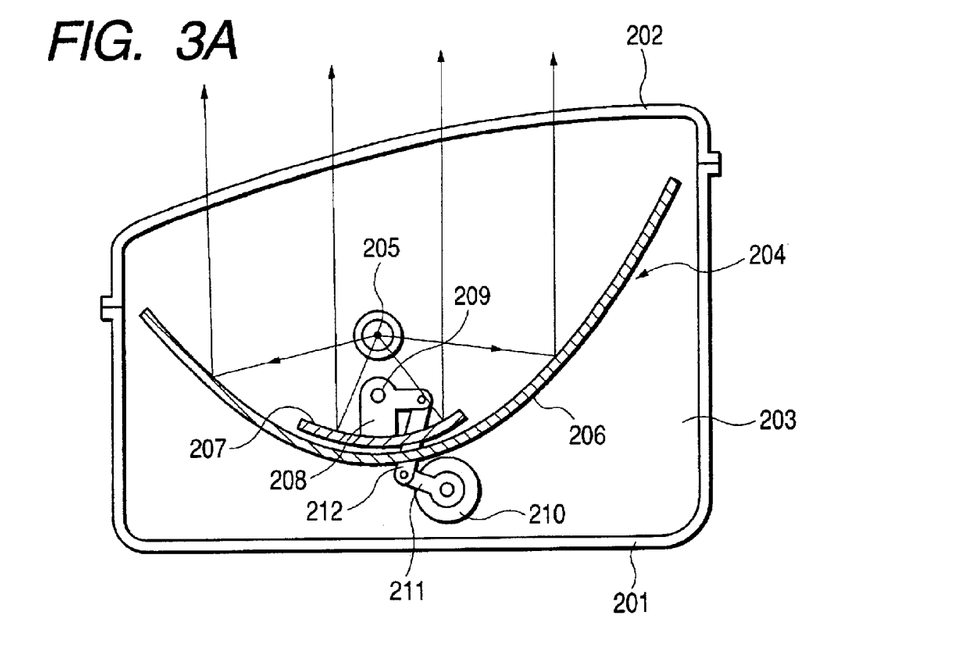
FIGS. 3A and 3B are cross-sectional views showing a reflector type lamp.

FIG. 3A is a cross-sectional view showing a schematic structure in the case in which the headlamp or the fog lamp is constituted by a reflector type lamp and the lighting direction control mechanism of the lamp is provided. More specifically, a reflector 204 and a bulb 205 to be a light source are provided in a lamp housing 203 constituted by a container-shaped lamp body 201 having a forward part opened and a lens 202 attached to the front opening of the lamp body 201, and a light emitted from the bulb 205 is reflected by the reflector 204 and an illumination is carried out in a required lighting area through the lens 202. The reflector 204 is constituted by a main reflector 206 and a subreflector 207 provided to overlap with a partial area in a position on the internal surface side of the main reflector 206 and supported on a support arm 208 which is rotatable in a horizontal direction around a shaft 209 provided in the vicinal position of the bulb.

Figure 3B:
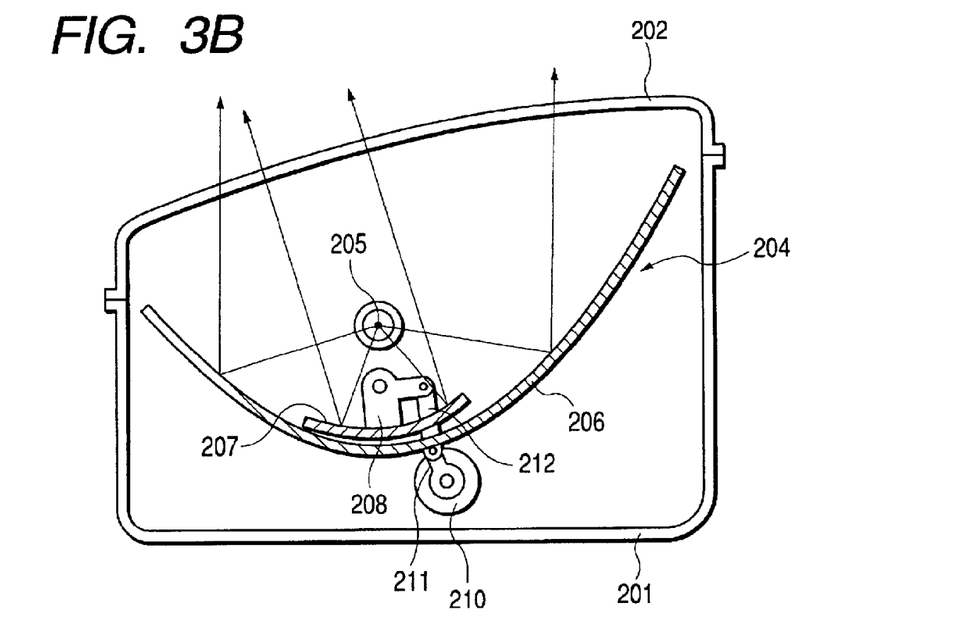

The main reflector 206 is fixedly provided in the lamp body 201. The subreflector 207 is tilted within a small angle range in a transverse direction in a horizontal plane around the shaft 209 by the rotating operation of a motor 210 provided in the lamp body 201 by means of a lighting direction control mechanism comprising the motor 210, a crank 211 integrated with the rotating shaft of the motor 210 and a connecting arm 212 for connecting the tip of the crank 211 with a part of the support arm 208. As shown in FIG. 3B, consequently, the motor 210 is rotated to control the tilt angle of the subreflector 207 so that the light which is emitted from the bulb 205 and is reflected by the subreflector 207 is deflected in a left or right direction with respect to the optical axis of the main reflector 206 according to the tilt angle of the subreflector 207 and the deflected light is integrated with the light reflected by the main reflector 206. Thus, a change in the direction of the optical axis of the whole lamp can be controlled in the transverse direction.

Figure 4:
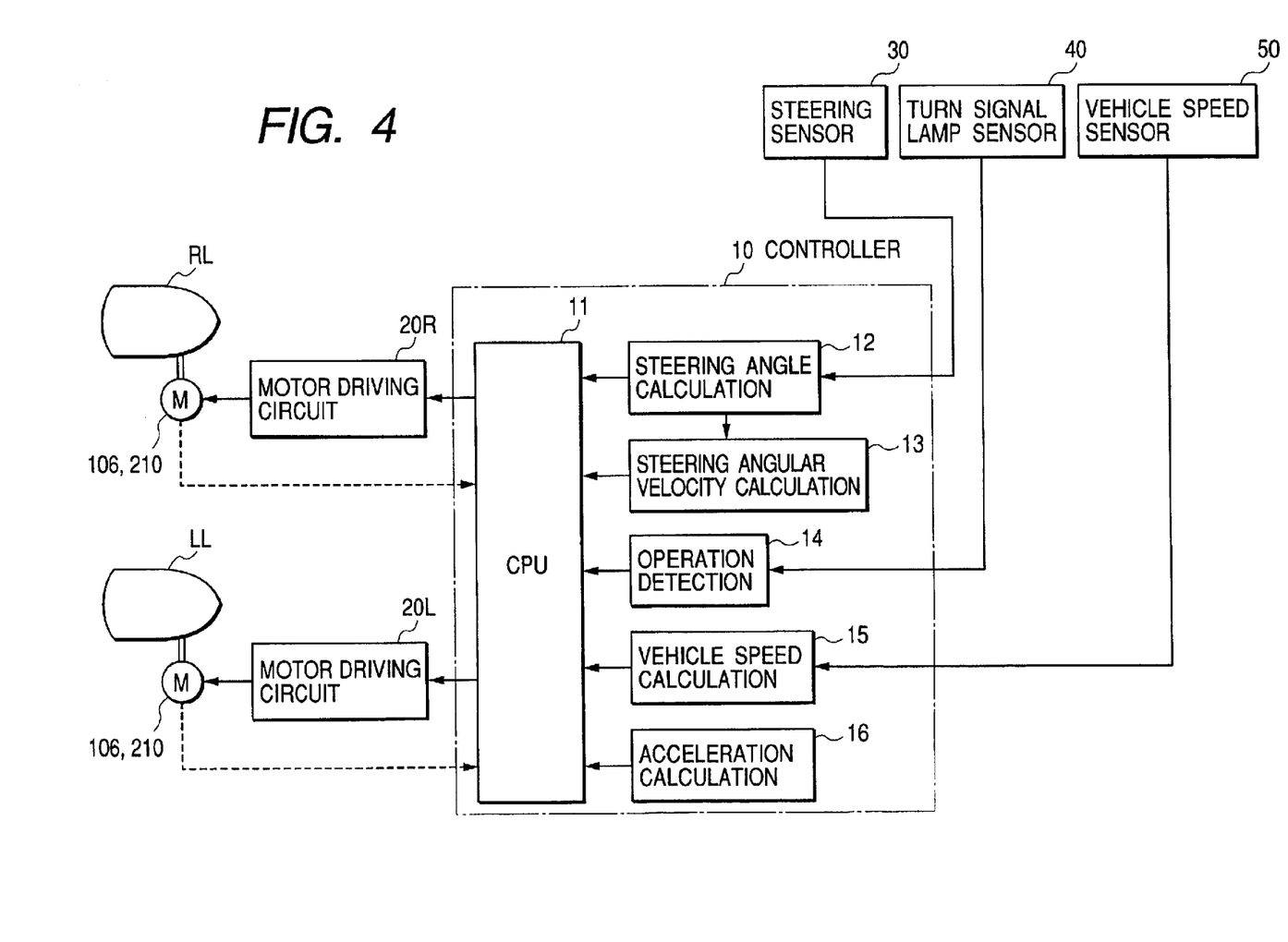
FIG. 4 is a block diagram showing the circuit structure of the lighting system according to the invention.

FIG. 4 is a block diagram showing the circuit structure of a vehicle light apparatus according to the invention in which two left and right lamps LL and RL comprising the lighting direction control mechanism shown in FIG. 2 or 3 are applied to a headlamp or a fog lamp. Motors RM and LM (106, 210) provided in the lighting direction control mechanisms of the lamps RL and LL are constituted in such a manner that a rotation is controlled by the supply of a required driving power from motor driving circuits 20R and 20L to be controlled by a controller 10 respectively and a change in the direction of the optical axis to be the lighting direction is thus controlled as described above. The controller 10 inputs the output of a steering sensor 30 provided in a steering wheel of a car and serving to detect the rotating angle of the steering wheel, the output of a turn signal lamp sensor 40 for detecting whether or not the turn signal lamp (winker) of a car carries out a flashing operation, and the output of a vehicle speed sensor 50 for detecting the speed of a car, respectively.

The controller 10 comprises an angle calculating section 12 for calculating, from the output of the steering sensor 30, the steering angle of a car, that is, the angle of the steering wheel which is closely related to a steering angle in the straight running direction of the car, and an angular velocity calculating section 13 for calculating the change rate of the steering angle thus calculated, that is, an angular velocity. It is assumed that the steering angle is an angle turned in the right or left direction with an angle in the straight running direction set to be zero degree. For example, the right direction is set to be a plus angle and the left direction is set to be a minus angle. Moreover, there is provided a turn signal lamp operation detecting section 14 for detecting whether or not the turn signal lamp is operated, that is, the car is set in such a state as to change a course in response to the output of the turn signal lamp sensor 40. Furthermore, there are provided a vehicle speed calculating section 15 for calculating the speed of a car in response to the output of the vehicle speed sensor 50 and an acceleration calculating section 16 for calculating a change rate of the vehicle speed thus calculated, that is, an acceleration. Each of the outputs of the angle calculating section 12, the angular velocity calculating section 13, the turn signal lamp operation detecting section 14 and the vehicle speed calculating section 15 is sent to a central processing unit (CPU) 11 and the CPU 11 serves to set the lighting range of the lamp L based on these information and to send a control signal to the motor driving circuits 20R and 20L based on the setting. The CPU 11 includes various functions such as an angular velocity comparing function of comparing an angular velocity input from the angular velocity calculating section 13 with a preset velocity and a vehicle speed comparing function and an acceleration comparing function which serve to compare the vehicle speed and the acceleration input from the vehicle speed calculating section 15 with preset values. When the lighting ranges of the lamps RL and LL are to be set in the CPU 11, moreover, the rotating angle positions of the motors RM and LM provided in the lamps RL and LL may be fed back as information about a current lighting range set in the lamp, for example, information about the direction of an optical axis as shown in a broken line of FIG. 4.

Figure 5A:
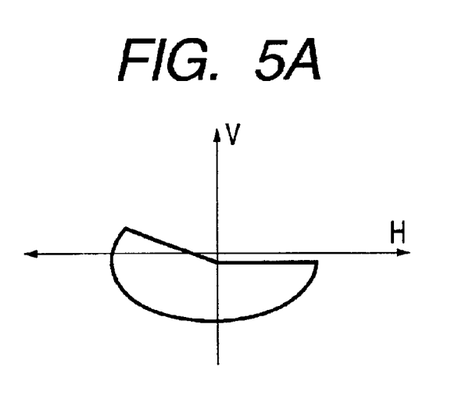
FIGS. 5A and 5B are light distribution characteristic charts in the case of application to a headlamp.
Figure 6:
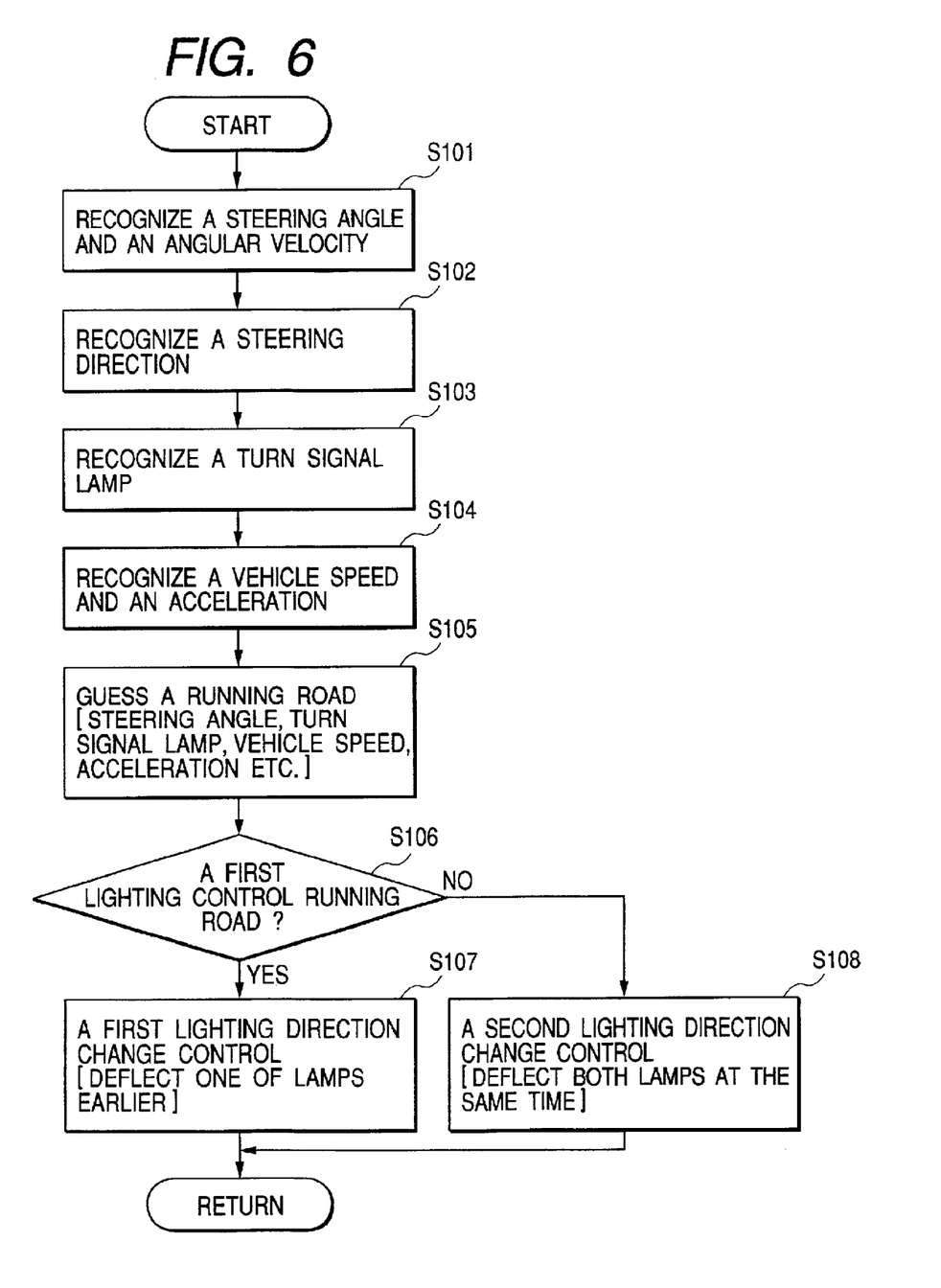
FIG. 6 is a flow chart for explaining a lighting direction control operation.
Figure 7:
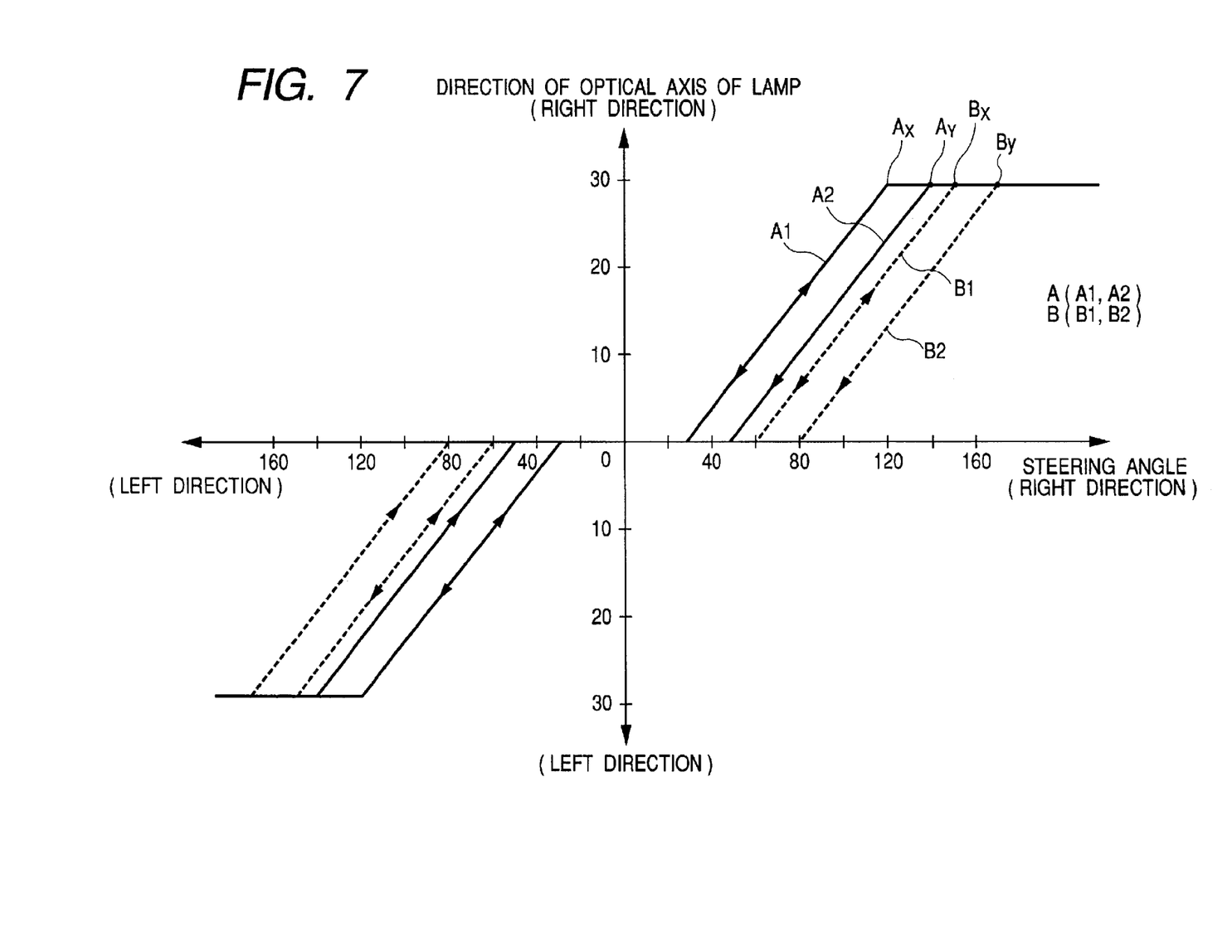
FIG. 7 is a chart showing a correlation between a steering angle and a lighting direction.

Description will be given to an operation for controlling a lighting range in the lighting system having the above-mentioned structure. First of all, description will be given to the case in which a projector type lamp shown in FIG. 2 is constituted as a headlamp. FIG. 5A is a light distribution characteristic chart indicating a lighting range in a normal condition with the low beam of the headlamp, resulting in a light distribution in a lighting area in which a right half is downward stepped in a straight running direction. FIG. 6 is a flow chart for explaining a control operation, and FIG. 7 is a chart showing a correlation between a steering angle and the directions of the optical axes of the lamps RL and LL which are changed by a lighting direction control mechanism. In FIG. 6, first of all, the steering angle calculated from the output of the steering sensor by the angle calculating section 12 and the steering angular velocity calculated by the angular velocity calculating section 13 based on the steering angle are recognized (S101). Moreover, whether a steering direction, that is, a current steering angle position is present in a right steering area (steering in a right direction) or a left steering area (steering in a left direction) is recognized based on the steering angle (S102). Furthermore, a direction to which the running direction of a vehicle is to be changed is recognized from the output of the turn signal lamp sensor 40 (S103). Moreover, the vehicle speed and the acceleration of the vehicle are recognized from the output of the vehicle speed sensor 50 (S104). It is apparent that a negative acceleration, that is, a deceleration is recognized.

Next, a running road predicting processing (S105) is carried out. The running road predicting processing S105 serves to guess that a forward road on which a vehicle is to run is a road requiring a steering operation at a great angle such as a curved road or an intersection road or a road to carry out the steering operation at a small angle such as a lane change based on the steering angle, the steering angular velocity, the operation state of the turn signal lamp and the acceleration (deceleration) which are recognized at the previous steps. For example, in the case in which the deceleration is great at a medium vehicle speed or less, the turn signal lamp is operated and the steering angle is increased, the road is guessed to be a branch road such as an intersection road. On the other hand, in the case in which the deceleration is small at the medium vehicle speed or more or the acceleration is equal to or greater than a certain value, the turn signal lamp is operated and the steering angle is not changed very greatly, the road is guessed to carry out the lane change. In the case in which the acceleration is small at an almost medium vehicle speed and the turn signal lamp is not operated, furthermore, the road is guessed to be a gentle curved road. When the turn signal lamp is operated and the vehicle speed is equal to or less than a predetermined speed, for example, 30 km/h or less, moreover, it is decided that a turn is made on an intersection road. When the vehicle speed is 10 km/h or less, for example, it is decided that a parking lot is reached. Referring to the running road guess, the running road may be guessed by taking a steering angular velocity into account in addition to the foregoing.

Figure 5B:
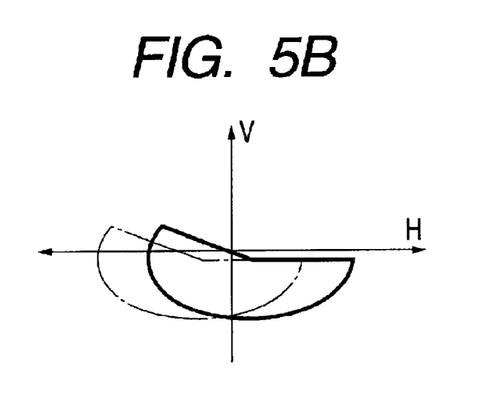
Figure 8:
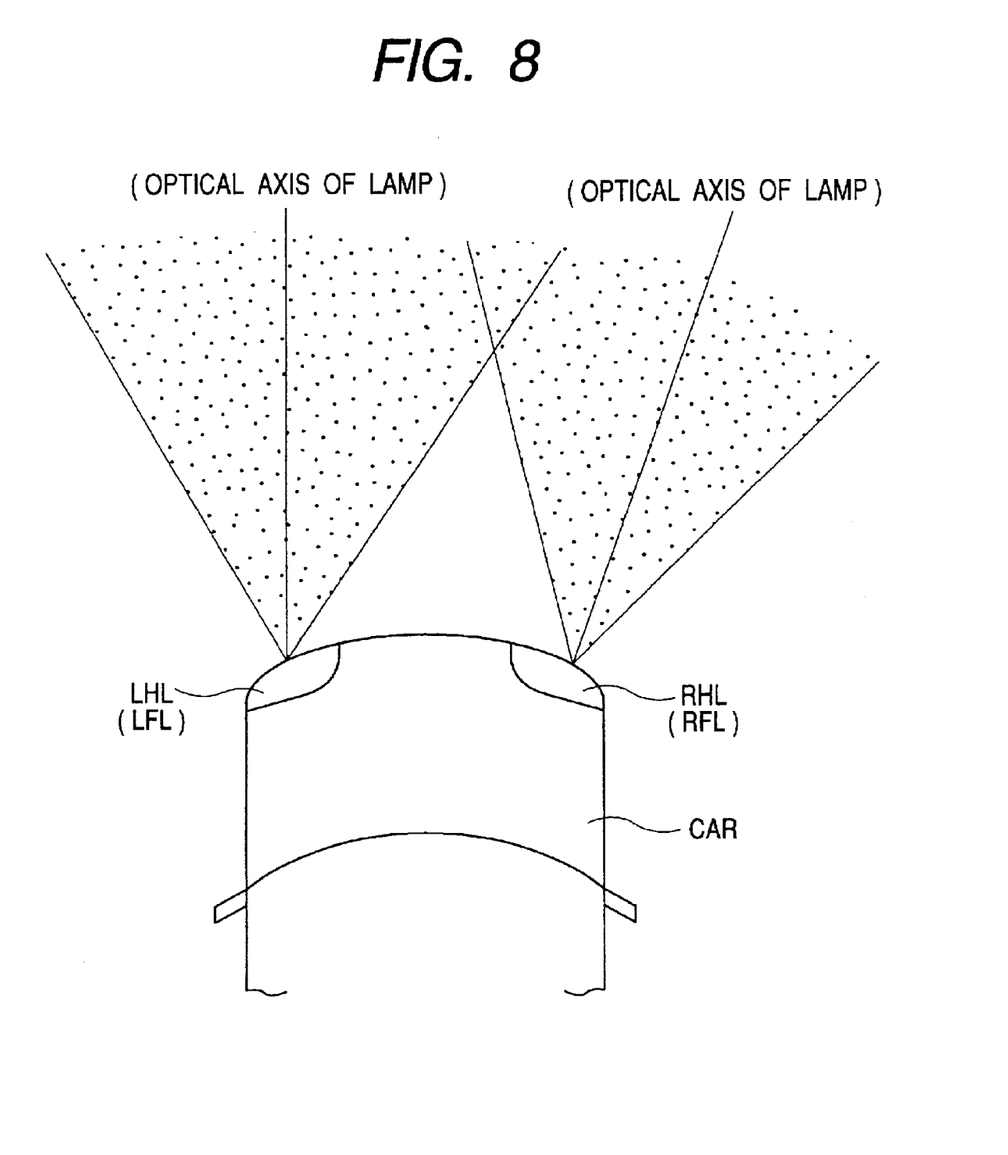
FIG. 8 is a view for explaining a lighting direction by the lighting direction control operation.

Next, it is decided whether the guessed running road is a first lighting control running road or not, that is, the intersection road, the lane change or the parking lot (S106). In the case in which the running road is the first lighting control running road, that is, a road requiring the illumination of a wide range, for example, a running road other than a curved road in which other cars or obstacles might be present except for the running direction of a self-vehicle, a first lighting direction change control is executed (S107). In the first lighting direction change control S107, as shown in FIG. 7, the direction of the optical axis of one of the left and right lamps LL and RL is earlier deflected into a steering direction based on a characteristic shown in a solid line A1, and a further increase in the steering angle is waited and the direction of the optical axis of the other lamp is deflected into the steering angle based on a characteristic shown in a broken line B1 on the basis of the recognition of the steering direction. For example, in the case in which a car is turned in a right direction, the motor driving circuit 20R of the right lamp RL is driven to deflect the direction of the optical axis of the right lamp, that is, the right headlamp RHL into the right direction when the steering angle is equal to or greater than a predetermined angle as shown in a solid line of FIG. 5B. At this time, the direction of the optical axis of the left headlamp LHL is held in a straight running direction as shown in FIG. 5A. Accordingly, the forward lighting area of the car in this state is set into such a state that the right forward part and the straight running direction of a car CAR are illuminated as shown in FIG. 8. Next, when the steering angle is further increased, the motor driving circuit 20L of the left lamp LL is driven to deflect the direction of the optical axis of the left lamp, that is, the left headlamp LHL into the right direction.

As is apparent from FIG. 7, in the lighting direction change control for the steering angle, a so-called play is given and a change control is not carried out before a predetermined angle, that is, 30 degrees in this example is exceeded in a transverse direction from zero degree at which the steering angle is set into a straight running direction, and the change control in a lighting direction is executed for an area exceeding 30 degrees. In the case in which the steering angle is slightly changed during straight running, consequently, the direction of the optical axis of the lamp can be prevented from being changed. Moreover, a maximum angle in the direction of the optical axis of the headlamp is preset to 30 degrees for left and right respectively in this example. Even if the steering angle is increased after points Ax and Bx in FIG. 7 at which the maximum angle is reached, the direction of the optical axis of the lamp is held to have the maximum angle and is not changed.

On the other hand, in the case in which the steering angle is decreased, that is, the steering is returned from the steering direction to the straight running direction, the motor driving circuit 20L of the lamp LL is earlier controlled reversely to the foregoing to return the direction of the optical axis of the left headlamp LHL into the straight running direction based on a characteristic shown in a broken line B2 of FIG. 7, and a decrease in the steering angle by further steering is waited and the motor driving circuit 20R of the lamp RL is controlled to return the direction of the optical axis of the right headlamp RHL into the straight running direction based on a characteristic shown in a broken line A2 of FIG. 7 in this example. Also in both of the characteristics shown in the solid line A and the broken line B, when the direction of the optical axis of the lamp is controlled over the solid line A1 or the broken line B1 and the steering is returned into the straight running direction, the direction of the optical axis of the lamp is returned from that position along the characteristics A1 and B1. Moreover, when the steering is returned into the straight running direction in respective positions between Ax and Ay or between Bx and By in which the direction of the optical axis of the lamp reaches the maximum angle, the direction of the optical axis of the lamp is returned from that position with the same tilt angle characteristics as the characteristics A1 and B1. When the direction of the optical axis of the lamp reaches the maximum angle to return the steering from the position having a steering angle exceeding Ay and By into the straight running direction, the direction of the optical axis of the lamp is returned to Ay and By with the maximum angle maintained and is then returned into the straight running direction along the characteristics A2 and B2.

Figure 9A:
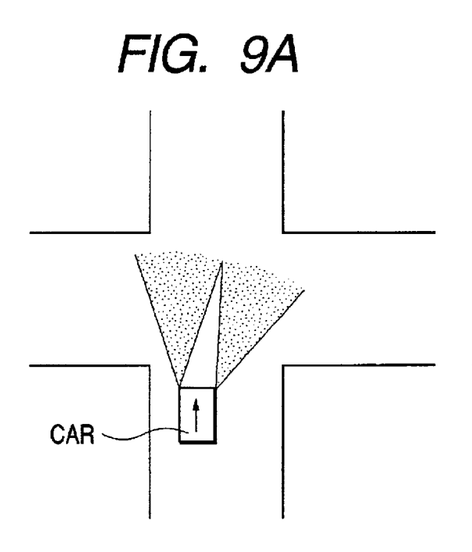
FIGS. 9A and 9B are views for explaining lighting directions at time of a right turn and running to return into a straight running direction on an intersection road, respectively.
Figure 9B:
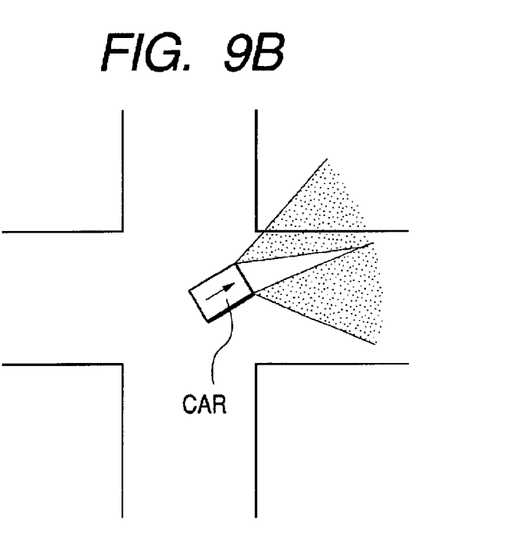

In the case in which the car changes a running direction and a running condition in which other cars or obstacles might be present in a straight running direction is set, for example, a right turn is made on an intersection road as described above, thus, only the direction of the optical axis of the right headlamp RHL is earlier deflected in a right direction and the direction of the optical axis of the left headlamp LHL is maintained in the straight running direction. As shown in FIG. 9A, therefore, the rightward running direction and the straight running direction of the car are illuminated respectively as is dotted in each drawing when a right turn is made on the intersection road of the car CAR, which is preferable for maintaining safe running. When the steering operation of the car is further carried out in the right direction, the direction of the optical axis of the left headlamp LHL is also turned in the right direction so that an illumination is carried out more greatly in the right direction of the running direction. In a running condition in which the car is returned into the straight running state after the right turn, similarly, the direction of the optical axis of the left headlamp LHL is earlier returned into the straight running direction. At that time, the direction of the optical axis of the right headlamp RHL is turned in the right direction and is returned into the straight running direction with a delay. As shown in FIG. 9B, therefore, the right direction and the straight running direction of the car are illuminated respectively, which is preferable for maintaining the safe running.

On the other hand, if the guessed running road is not the first lighting control running road at the step S106 of FIG. 6, a second lighting direction change control is executed (S108). At the second lighting direction change control S108, the right and left lamps RL and LL are deflected integrally, that is, simultaneously based on a characteristic shown in a solid line of FIG. 7. For example, when the car is running on a gentle curved road rightwards, each of the motor driving circuits 20R and 20L of each lamp is controlled to deflect the right headlamp RHL and the left headlamp LHL at the same time in the same direction. In the running on a curved road in which the turn signal lamp is not operated, thus, other cars and obstacles are not present in the straight running direction of a self-vehicle. For this reason, it is not particularly necessary to carry out lighting in the straight running direction. Thus, the lighting can be carried out more greatly in the running direction of the car so that a safe running property can be enhanced.

The description has been given to the running condition in which the car makes a turn in the right direction or the running condition in which the car is returned from the right direction into the straight running direction. With the replacement of the left and right lamps, it is also possible to easily implement a running condition in which the car makes a turn in a left direction or a running condition in which the car is returned from the left direction into the straight running direction. Moreover, while the direction of the optical axis of the lamp in such a direction that the car makes a turn is deflected earlier in the embodiment, the direction of the optical axis of the lamp on the opposite side can also be controlled to be deflected earlier. The irradiation range of the lamp in this case is shown in a broken line of FIG. 5B.

Figure 10A:
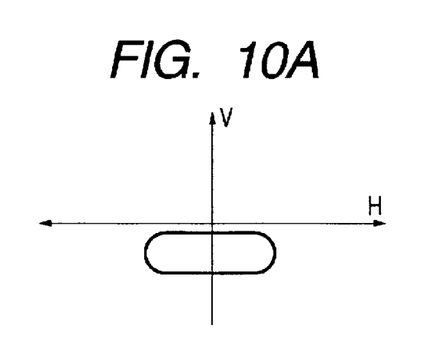
FIGS. 10A and 10B are light distribution characteristic charts in the case of application to a fog lamp.
Figure 10B:
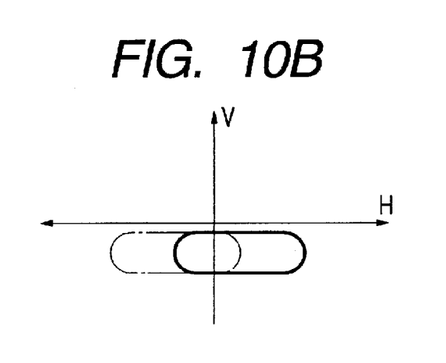

The above description can also be given to the case in which the projector type lamp is used as a fog lamp. The light distribution characteristic of the lamp in this case is shown in FIGS. 10A and 10B. More specifically, also in the case in which the direction of the optical axis of one of the lamps is deflected rightwards (a solid line) or leftwards (a broken line) as shown in FIG. 10B, the direction of the optical axis of the other lamp is maintained in the straight running direction as shown in FIG. 10A. When a steering angle is increased, furthermore, the direction of the optical axis of the other lamp is deflected as shown in FIG. 10B. Also in the illumination to be carried out by the fog lamp, consequently, it is possible to maintain the safe running by a driver.

Also in the case in which the reflector type lamp shown in FIG. 3 is constituted as a headlamp or a fog lamp, the same operation is carried out. The reflector type lamp has such a characteristic that the irradiation area of the whole lamp is slightly enlarged in a left direction or a right direction with the tilt of the subreflector 207 and an irradiation range thereof is slightly different from that in FIGS. 5 and 10. Also in the reflector type lamp, however, the substantial direction of the optical axis of the lamp is changed by the tilt of the subreflector 207 as described above. Accordingly, it is apparent that an equivalent control to the characteristic shown in FIG. 7 can be implemented. In the same manner as in the embodiment, consequently, it is possible to maintain an illumination in a straight running direction at time of the running of the car on an intersection road or a lane change, which is preferable for maintaining safe running.

Figure 11:
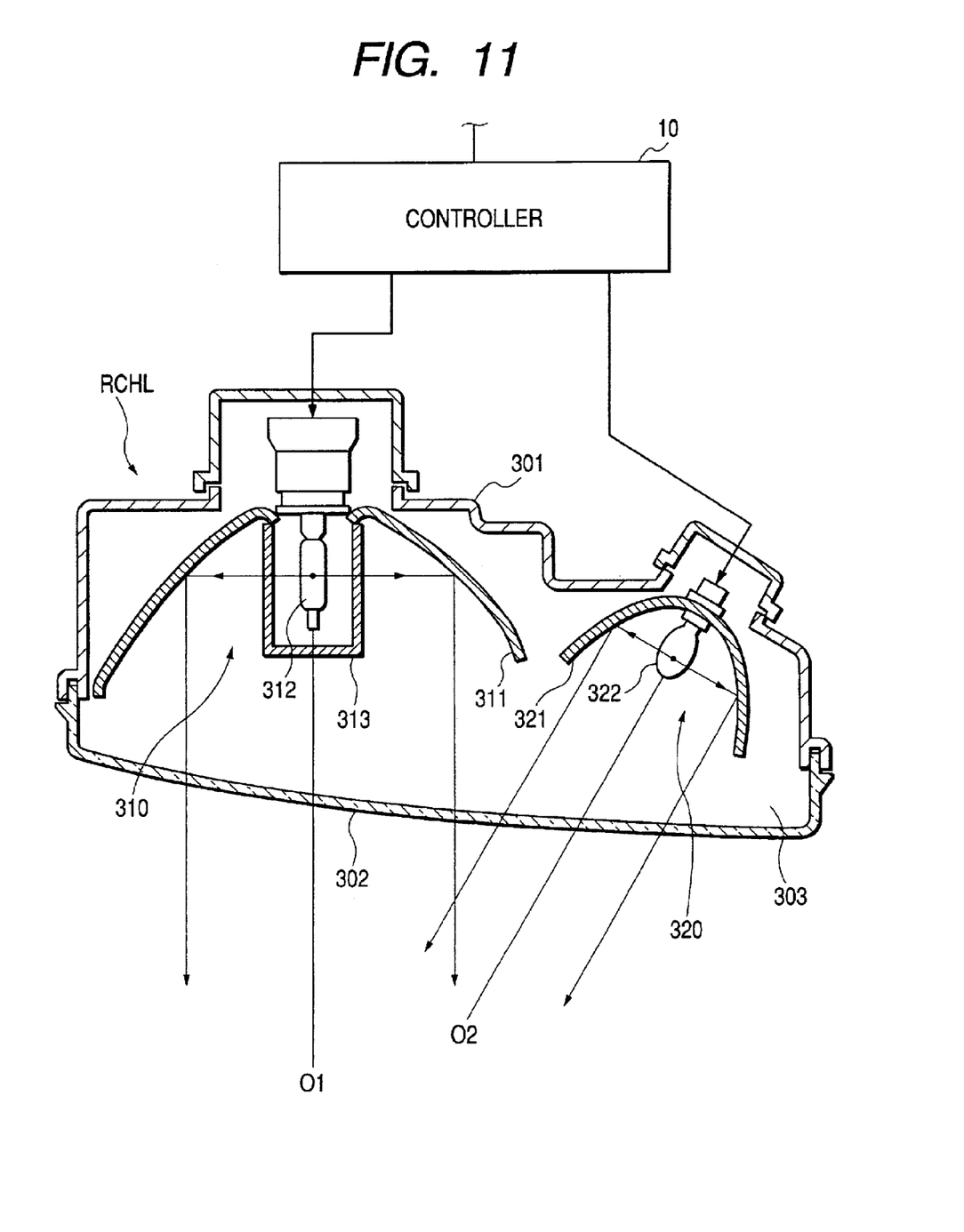
FIG. 11 is a sectional view showing a headlamp according to another embodiment of the invention.

The lamp according to the invention is not restricted to the projector type lamp and the reflector type lamp but the invention can also be applied to any lamp capable of controlling a change in a lighting direction. For example, a lamp shown in FIG. 11 is constituted as a right compound headlamp RCHL of a car in which a plurality of lamps having optical axes turned in different directions are compounded, and a low beam lamp 310 of the headlamp and a lighting direction adjusting lamp 320 are provided in a lamp housing 303 constituted by a lighting body 301 and a lens 302. The low beam lamp 310 is the same as a low beam lamp of a conventional headlamp, and comprises a reflector 311, a bulb 312 and a shade 313 and has an optical axis O1 turned in the straight running direction of the car. The lighting direction adjusting lamp 320 comprises a reflector 321 and a bulb 322 and has an optical axis O2 turned in a right direction from the straight running direction of the car. The bulbs 312 and 322 of the lamps 310 and 320 are connected to a controller 10 and the ON/OFF and luminance (brightness) of the bulbs 312 and 322 can be controlled by the controller 10. Various sensors are connected to the controller 10 in the same manner as the controller 10 described in each of the embodiments and description thereof will be omitted. Moreover, it is apparent that a left compound headlamp is formed symmetrically, which is not shown.

In the case in which a lighting direction is not changed in the right compound headlamp RCHL, only the low beam lamp 310 is turned on to carry out an illumination in the straight running direction of the car. In the case in which the lighting direction is to be changed, the lighting direction adjusting lamp 320 is also started to be turned on in addition to the ON operation of the low beam lamp 310 and a brightness thereof is gradually increased with an increase in a steering angle, while the brightness of the low beam lamp 310 is reduced. Consequently, the illumination is carried out in such a state that a light emitted from the low beam lamp 310 and turned in the straight running direction and a light emitted from the lighting direction adjusting lamp 320 and turned in the right direction are integrated. As a result, the lighting direction for the right compound headlamp RCHL is changed in the right direction. According to circumstances, when the lighting direction adjusting lamp 320 is turned on, the low beam lamp 310 may be turned off. In this case, an illumination is carried out by only the lighting direction adjusting lamp 320 in the lighting area of the right compound headlamp RCHL.

While the example in which a steering angle and an angular velocity are detected by a steering sensor for detecting the rotating angle of a steering wheel has been described in the embodiments, other sensors can also be utilized if a steering angle of a steering wheel or a steering device can be detected.

As described above, in the vehicle light apparatus according to the invention, when the vehicle changes the running direction, the direction of the optical axis of one of the lighting means is deflected earlier and the direction of the optical axis of the other lighting means is maintained in the straight running direction in a running condition in which other cars or obstacles might be present in the straight running direction of the vehicle, and the direction of the optical axis of the other lighting means is deflected with a delay upon receipt of a further steering operation. Consequently, it is possible to carry out an illumination in the running direction and the straight running direction of the vehicle. In particular, the invention is very effective for maintaining the safety running of the vehicle on an intersection road or at time of a lane change.

What is claimed is:

1. A vehicle light apparatus comprising:
   a plurality of lighting means each of which illuminates forward a vehicle; and
   lighting direction control means which changes a lighting range of said lighting means in response to a steering angle of the vehicle, and controls lighting directions of the lighting means independently or integrally in response to a running condition;
   wherein said lighting direction control means changes the lighting direction of a first part of the lighting means and changes the lighting direction of a second part of the lighting means later than the first part of the lighting means;
   wherein said lighting direction control means carries out a control such that the second part of the lighting means illuminates a straight running direction earlier than the first of the lighting means when a steering angle is changed from a steering direction into the straight running direction.

2. A vehicle light apparatus comprising:
   a plurality of lighting means each of which illuminates forward a vehicle; and
   lighting direction control means which changes a lighting range of said lighting means in response to a steering angle of the vehicle, and controls lighting directions of the lighting means independently or integrally in response to a running condition;
   wherein said lighting direction control means changes the lighting direction of a first part of the lighting means and changes the lighting direction of a second part of the lighting means later than the first part of the lighting means;
   wherein the lighting direction control means carries out a control such that the second part of the lighting means illuminates a steering direction later than the first part of the lighting means when a steering angle is changed from a straight running direction to the steering direction.

3. The vehicle light apparatus according to claim 1, wherein said lighting direction control means includes running road predicting means for predicting a running direction of the vehicle and serves to control the lighting direction when the running direction of the vehicle is predicted to be greatly changed by the running road predicting means.

4. The vehicle light apparatus according to claim 1, wherein said running condition is determined based on a vehicle speed.

5. The vehicle light apparatus according to claim 1, wherein said running condition is determined based on a vehicle acceleration.

6. The vehicle light apparatus according to claim 1, wherein in case of a turn signal lamp being operated, said lighting means are independently operated.

7. The vehicle light apparatus according to claim 4, wherein in case of the vehicle speed is less than a predetermined speed, said lighting means are independently controlled.

8. The vehicle light apparatus according to claim 4, wherein in case of the vehicle speed is greater than a predetermined speed and a turn signal lamp is not operated, said lighting means are integrally controlled.

9. The vehicle light apparatus according to claim 2, wherein said lighting direction control means includes running road predicting means for predicting a running direction of the vehicle and serves to control the lighting direction when the running direction of the vehicle is predicted to be greatly changed by the running road predicting means.

10. The vehicle light apparatus according to claim 2, wherein said running condition is determined based on a vehicle speed.

11. The vehicle light apparatus according to claim 2, wherein said running condition is determined based on a vehicle acceleration.

12. The vehicle light apparatus according to claim 2, wherein in case of a turn signal lamp being operated, said lighting means are independently operated.

13. The vehicle light apparatus according to claim 10, wherein in case of the vehicle speed is less than a predetermined speed, said lighting means are independently controlled.

14. The vehicle light apparatus according to claim 10, wherein in case of the vehicle speed is greater than a predetermined speed and a turn signal lamp is not operated, said lighting means are integrally controlled.

* * * * *